July 29, 1924.

W. CALAGANS

AEROPLANE

Filed Sept. 25, 1922   10 Sheets-Sheet 5

1,503,297

WITNESS:
Paul M. Hunt.

W. Calagans
INVENTOR
BY Victor J. Evans
ATTORNEY

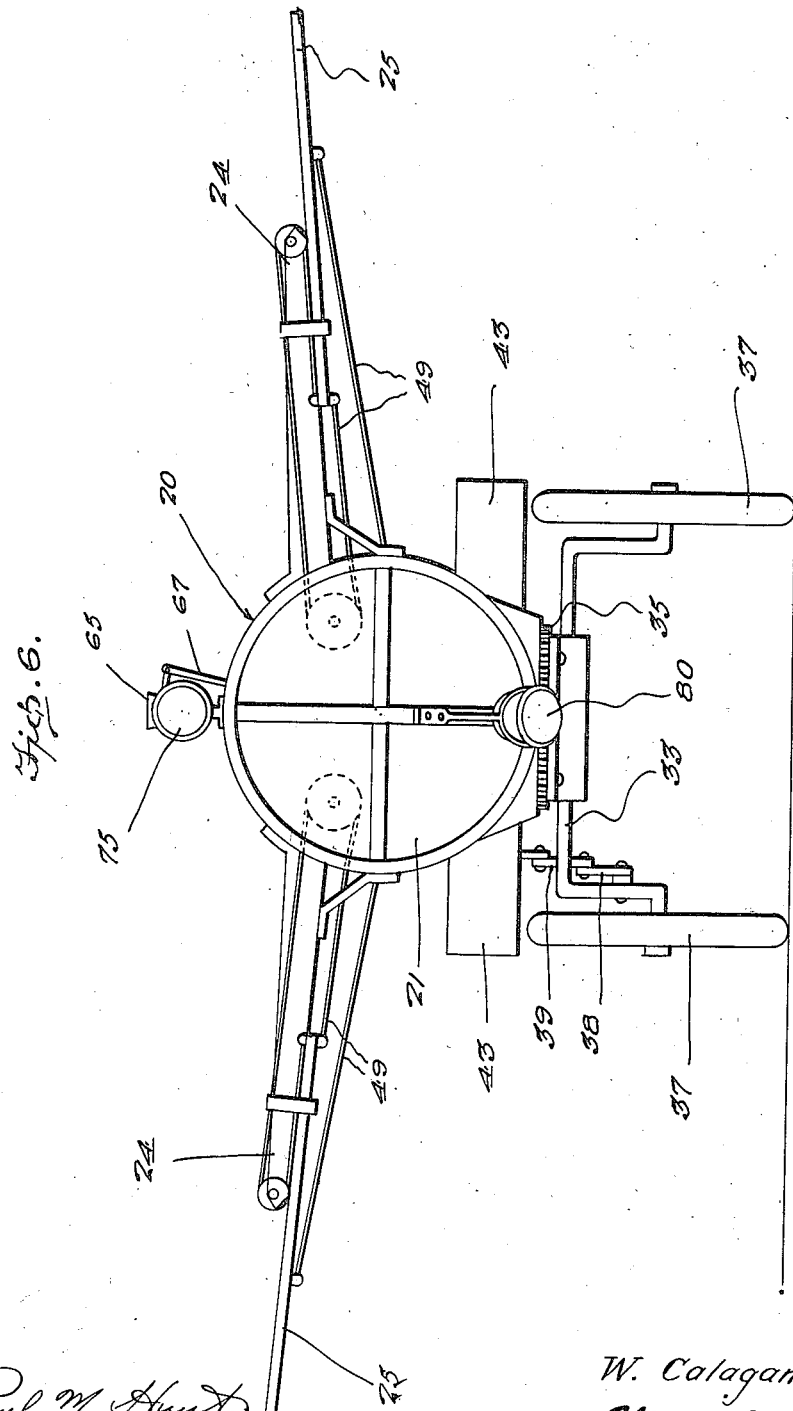

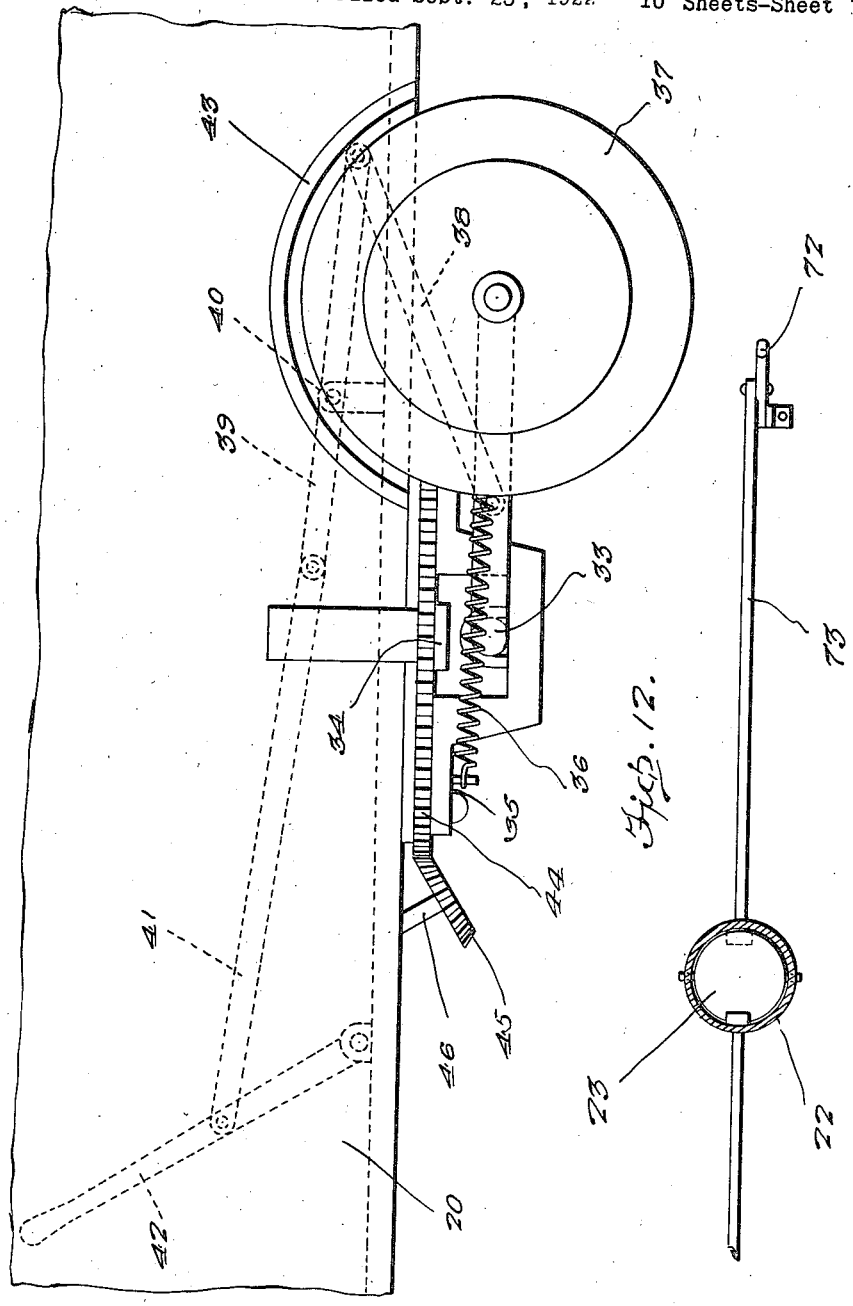

July 29, 1924.  1,503,297
W. CALAGANS
AEROPLANE
Filed Sept. 25, 1922   10 Sheets-Sheet 8

W. Calagans
INVENTOR

WITNESS:
ATTORNEY

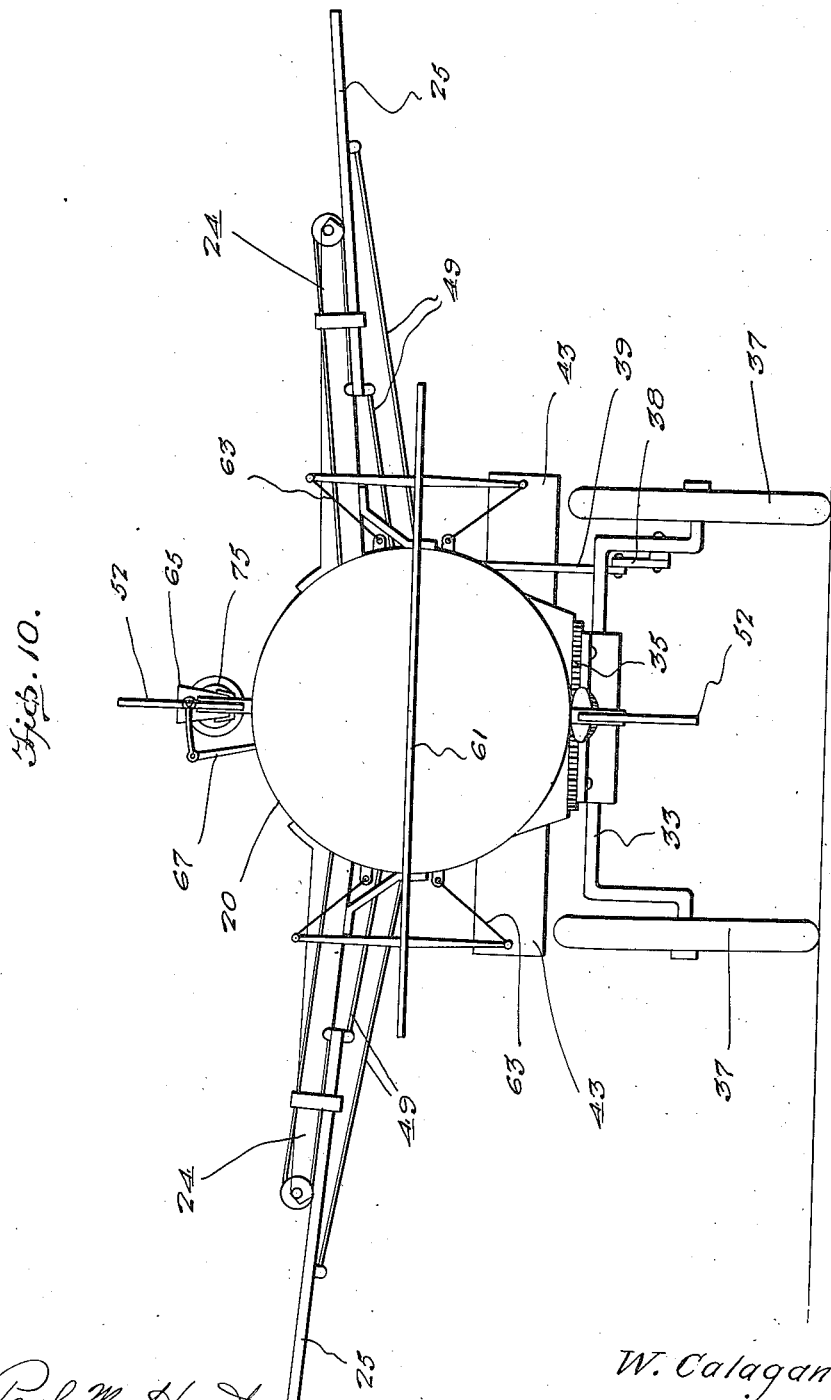

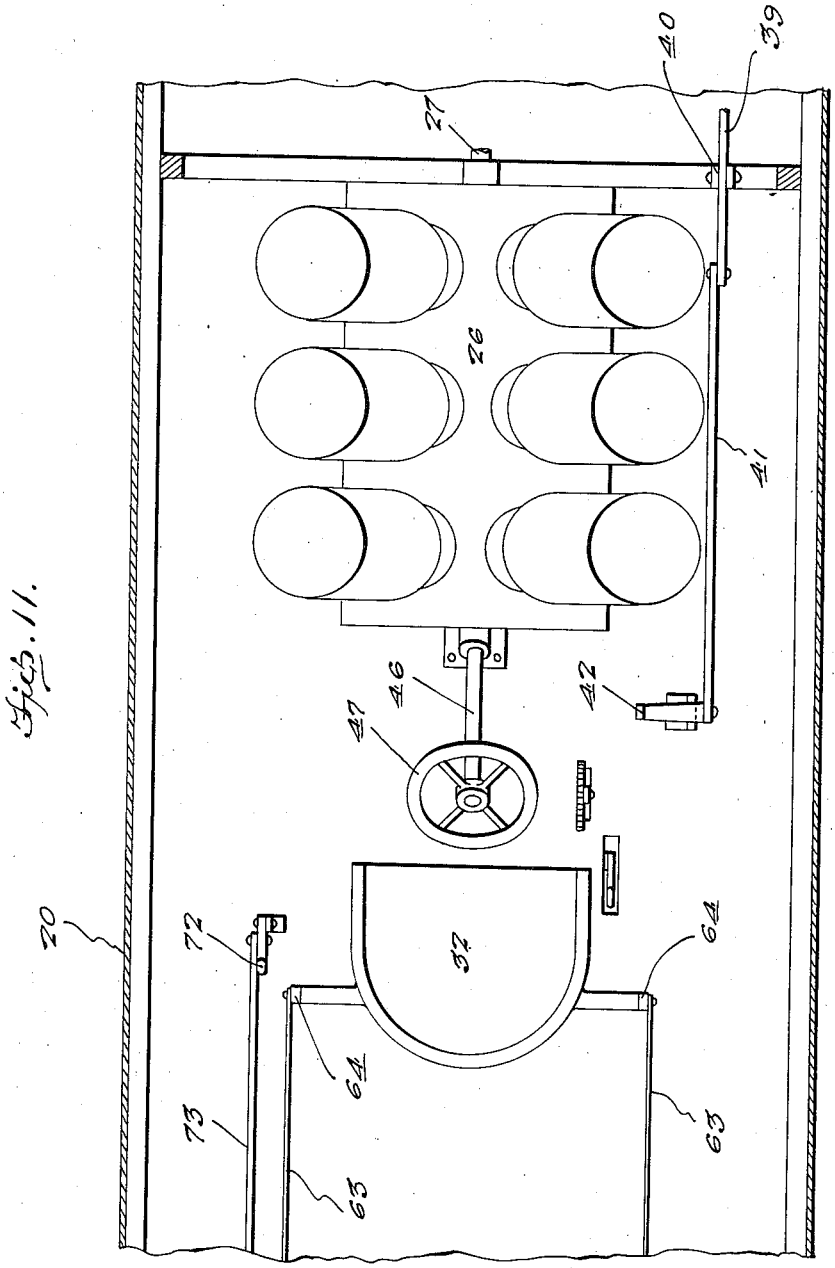

Patented July 29, 1924.

1,503,297

UNITED STATES PATENT OFFICE.

WILLIE CALAGANS, OF GARY, INDIANA.

AEROPLANE.

Application filed September 25, 1922. Serial No. 590,452.

*To all whom it may concern:*

Be it known that I, WILLIE CALAGANS, a citizen of the United States, residing at Gary, in the county of Lake and State of Indiana, have invented new and useful Improvements in Aeroplanes, of which the following is a specification.

This invention relates to aeroplanes and has for its object the provision of a novel device of this character embodying a large number of material improvements in the art in point of efficiency of control, adjustment and the like.

An important object is the provision of an aeroplane in which the wings are formed or provided with slidably adjustably mounted outer sections which may be slid so as to increase the supporting area, novel means within control of the driver being provided for effecting this adjustment even during flight.

Another object is the provision of an airship having a novel landing gear which is not only provided with shock absorbing means but which is also foldable up in to the body while in flight for the purpose of decreasing the air resistance.

Another object is the provision of a dirigibly mounted search light which is used when landing and which is controllable by the operator so that he may inspect the ground and ascertain a suitable place for landing, this landing light being provided in addition to the ordinary search light which is employed for other purposes.

Still another object is the provision of an airship having its body provided with a series of substantial vertical tubes through which air passes when the device is rising or descending, it being intended that means be operated for closing these passages or tubes when landing for the purpose of opposing additional resistance which will insure a more gentle landing.

Still another object is the provision of an aeroplane having a plurality of sets of wings and a plurality of engines which are individually or simultaneously controllable and either of which may be used alone, each engine being provided with separate accessory devices such as oil tanks, water tanks and the like.

A still further object is the provision of an airship having novel elevator and rudder control means whereby its steering during flight may be effected in a simple and efficient manner.

An additional object is the provision of a device of this character which will be simple and inexpensive comparatively speaking, highly efficient and a general improvement in the art.

With the above and other objects and advantages in view the invention consists in the details of construction to be hereinafter more fully described and claimed and illustrated in the accompanying drawings, in which:

Figure 3:
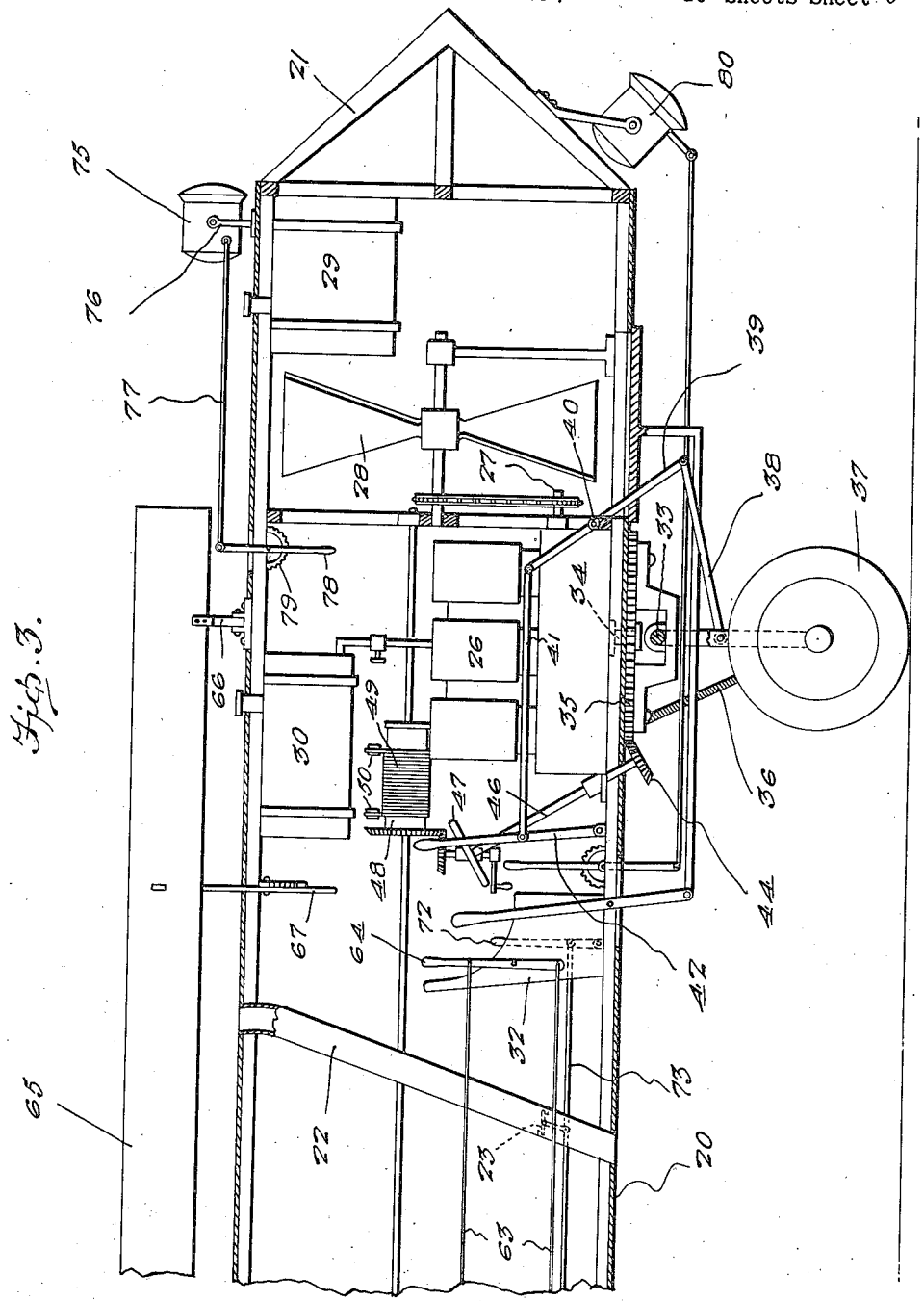
Figure 4:
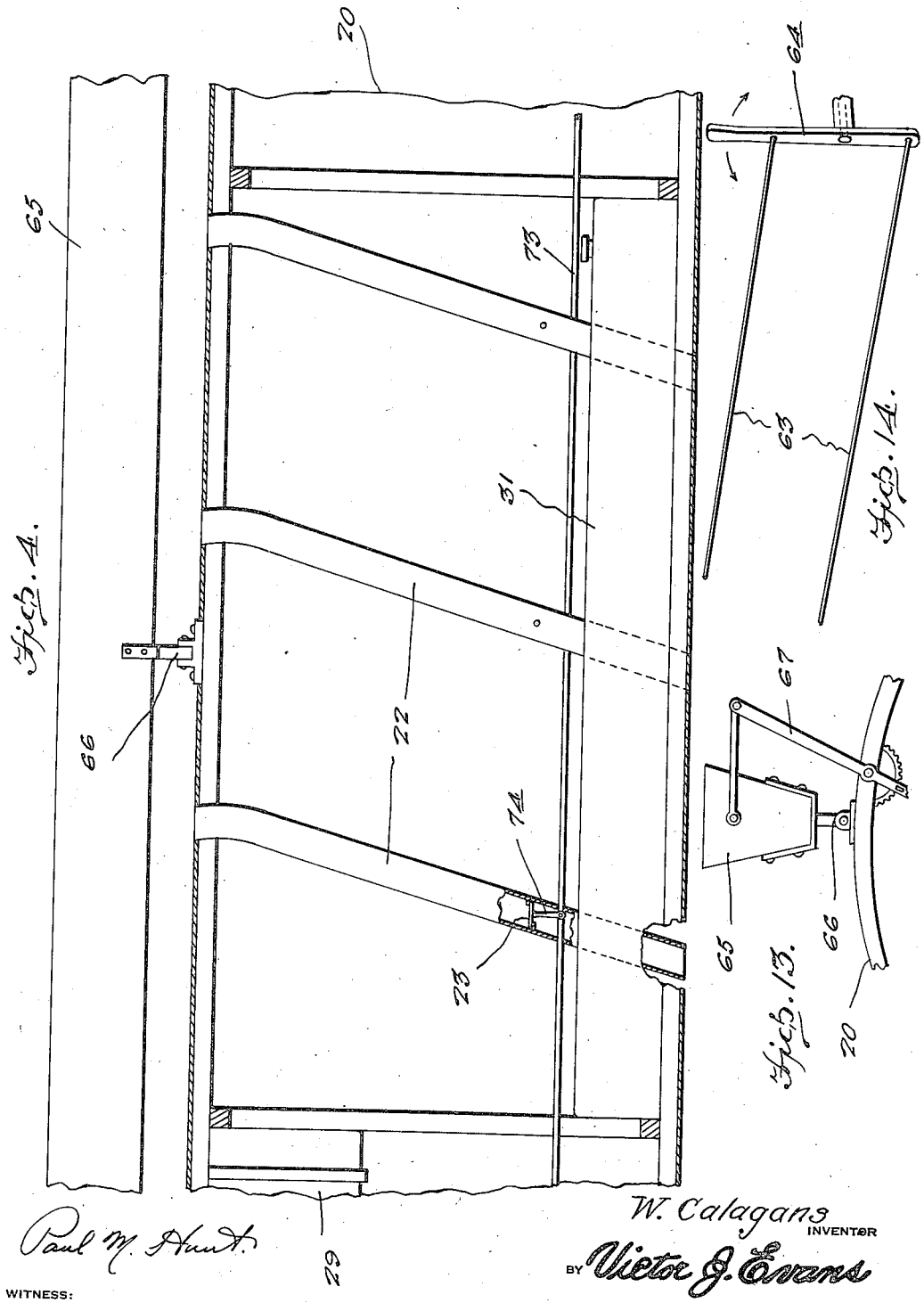
Figure 5:
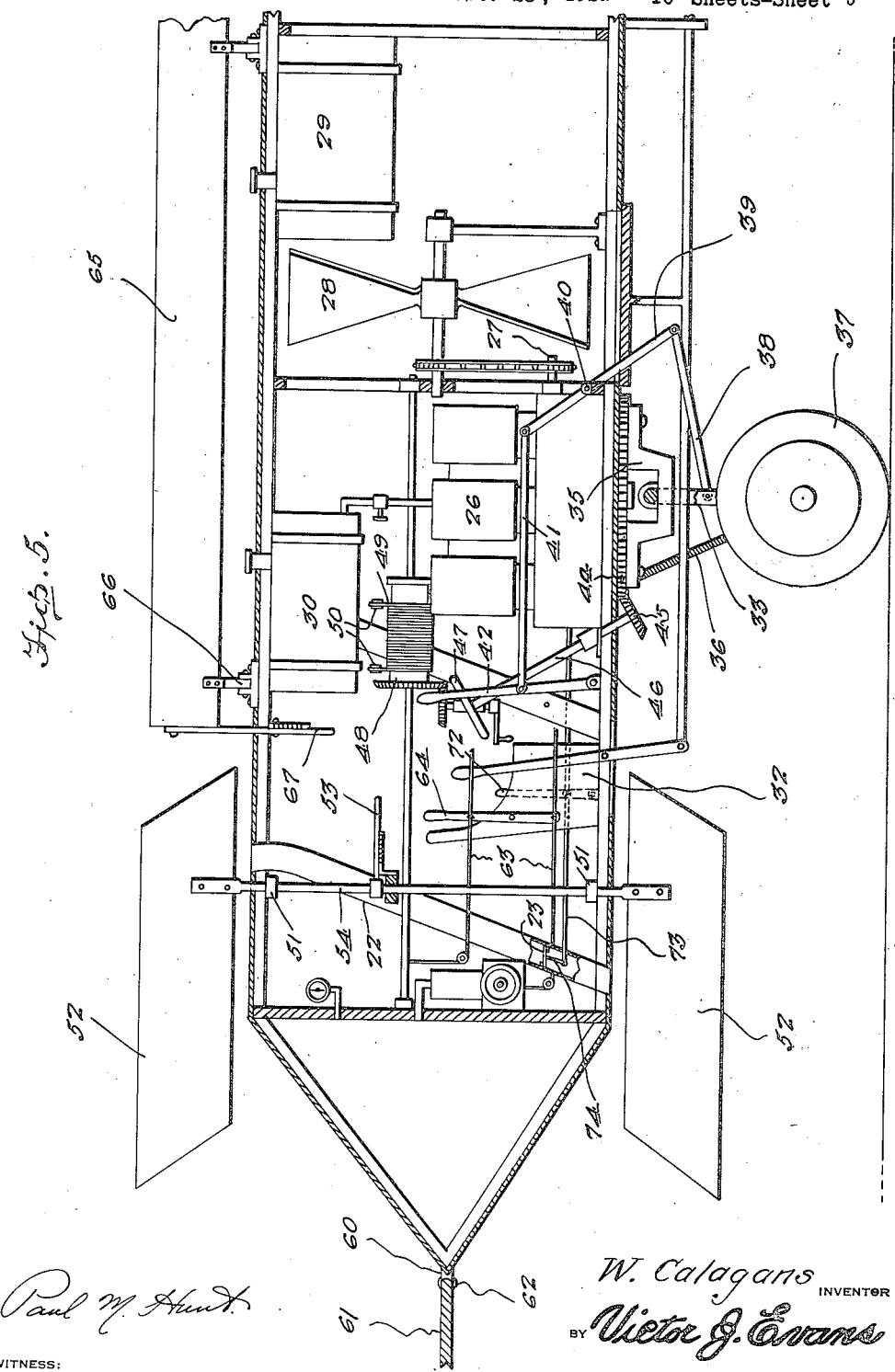
Figure 9:
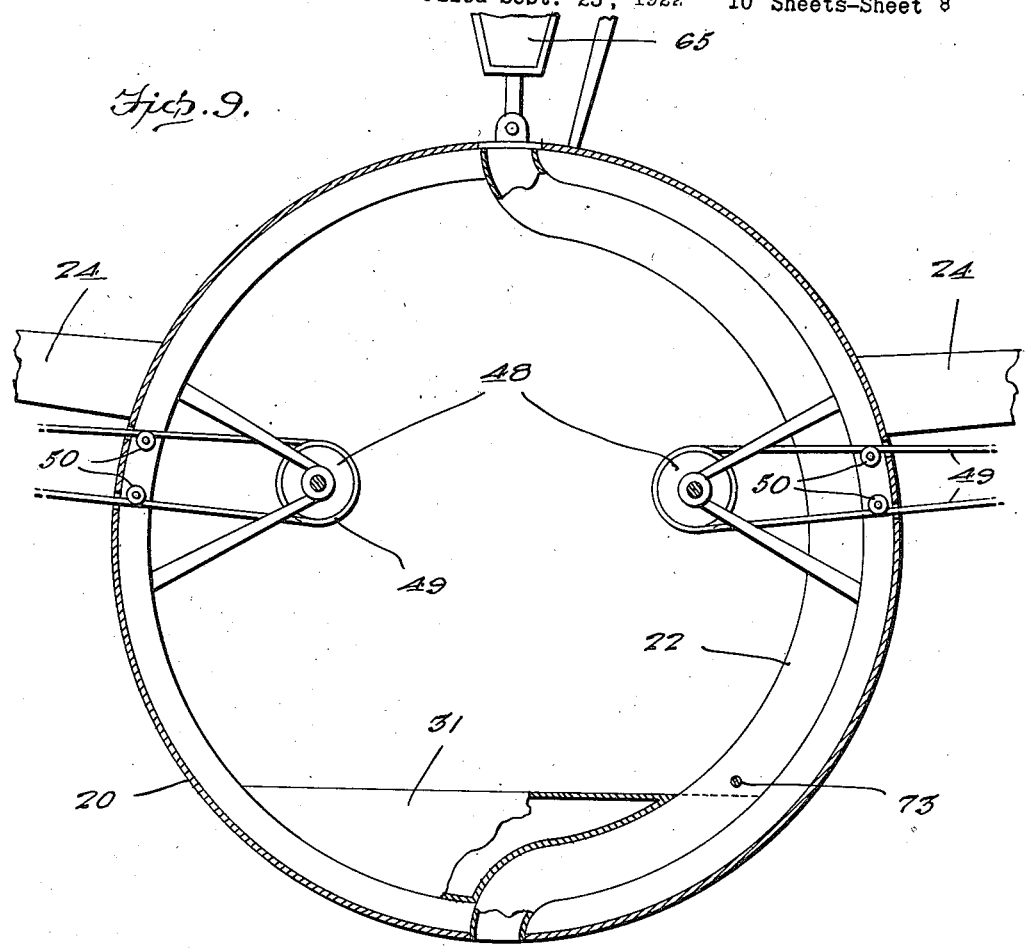
Figure 8:
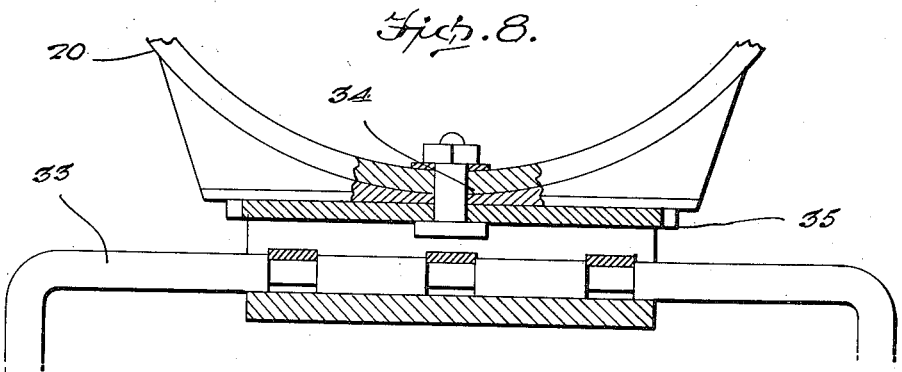

Figure 3 is a longitudinal section on a much larger scale through the front end, Figure 4 is a longitudinal section through the intermediate portion, Figure 5 is a similar view through the rear portion, Figure 6 is a front view, Figure 7 is a detail section through one end showing the landing wheel as swinging upwardly, Figure 8 is a detail cross sectional view showing the steering means for the dirigible front wheels, Figure 9 is a cross sectional view taken at a point intermediate the ends of the body, Figure 10 is a rear elevation, Figure 11 is a horizontal section through the front portion and showing a plan of the engine and control devices, Figures 12, 13 and 14 are detail views of certain elements of the control mechanism.

Referring more particularly to the drawings the numeral 20 designates the body or fuselage of the device which is relatively long and cylindrical in shape though it should be understood that variations in this respect may occur such as will suggest themselves to the builder. The material may be such as is commonly used in aeroplane construction. The forward end of the body is preferably more or less conical as indicated at 21 this conical end being provided with openings to permit free passage of air through the body. Arranged in the body at the peripheral portion thereof are slightly inclined tubes or passages 22 which have both ends open for communication with the atmosphere and these tubes are adapted to be closed to a great or less extent by means of damper plates 23 which are controlled by means to be hereinafter explained.

Suitably secured to and extending from the body near the upper portion thereof are sets of wings 24 which are stationary and which are braced, guyed and constructed in the usual manner. Slidably mounted beneath the outer edges of the wings are auxiliary wing extensions 25 which are adapted to be projected outwardly to a greater or less extent by the means to be described.

Mounted within the body at the forward and rear portion thereof are the motors 26 which have their shafts 27 connected with propellers 28 for the purpose of driving the latter and these propellers are of more or less conventional pattern and are located within the body as shown. Associated with each engine or motor and suitably suspended from the top of the body is a water tank 29 and an oil tank 30 while mounted in the bottom portion of the body is a longitudinally extending tank 31 for gasoline, this tank supplying both motors. Each motor is of course provided with the usual control mechanism which is more or less indicated in the drawings but which is not described in detail as the engines form no part of the present invention.

Mounted within the body to the rear of each engine is a seat 32 for the operator, there being two seats and two operators in the present instance, though it should be understood that there may be more motors than two and consequently an operator for each. These seats may be adjustably mounted and may be provided with the usual straps and the like for holding the operator in position. The various control levers are of course mounted adjacent these seats in position to be conveniently reached by the operators.

Figure 1:
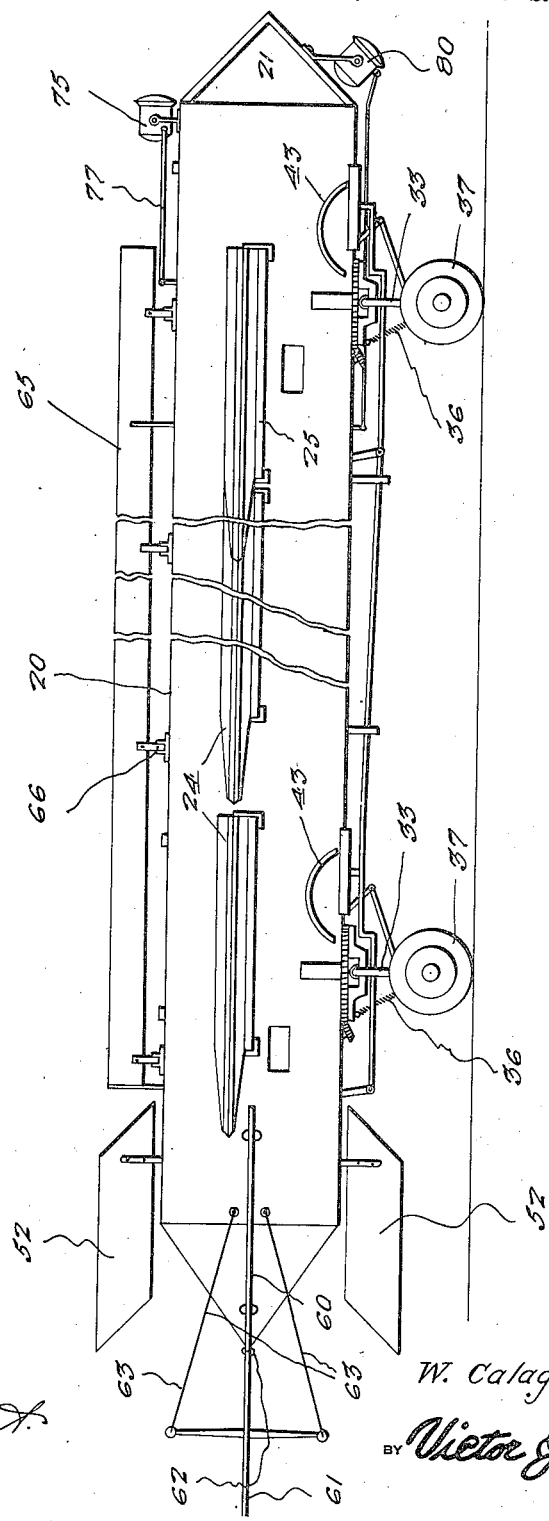
Figure 1 is a side elevation of the complete device.
Figure 2:
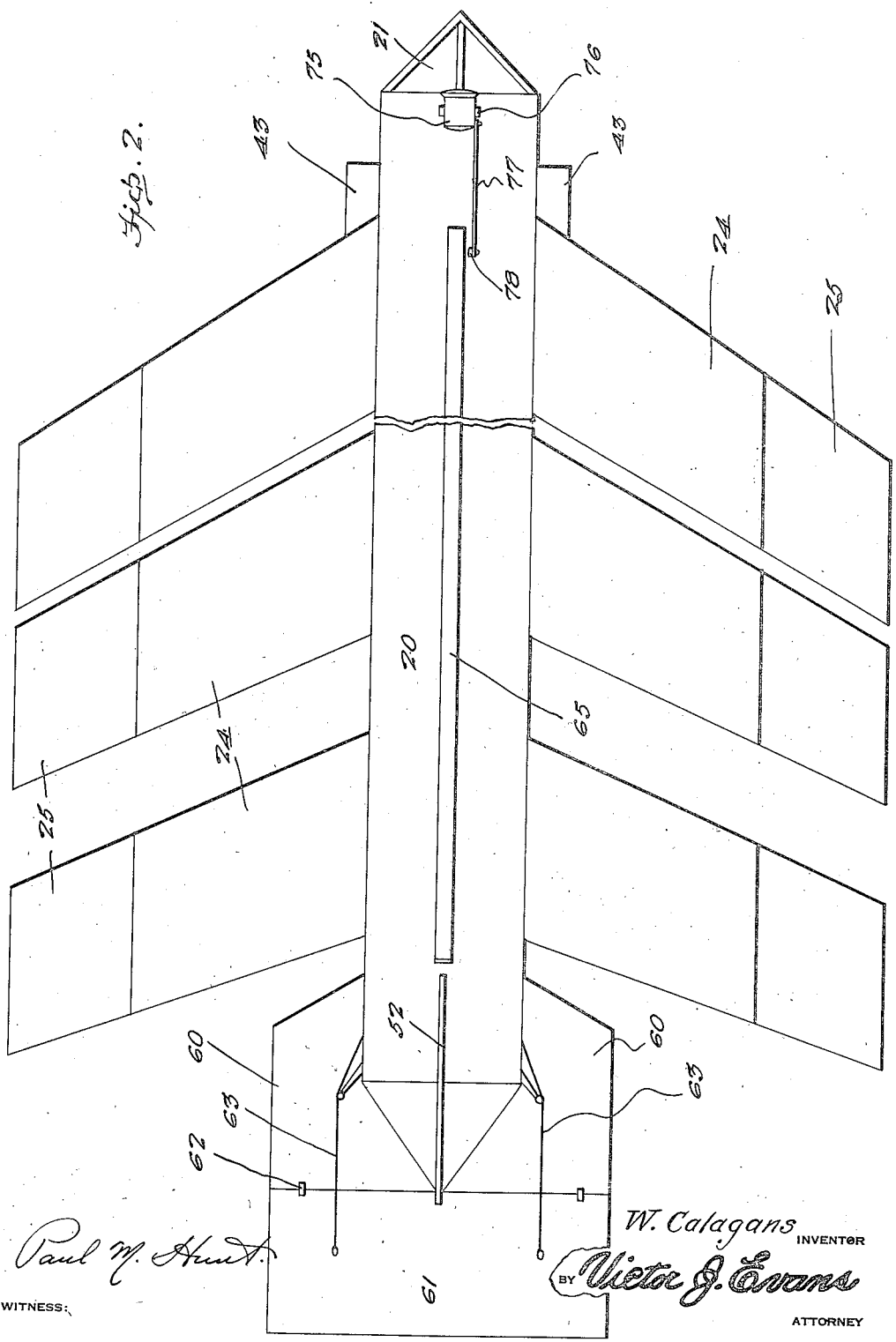
Figure 2 is a plan view.

The landing gear is the same at both ends and consists of an arch 33 pivoted on a wheel-like structure 35 which is in turn journaled on the underside of the body 34 and held in place by suitable frame work and braces. The construction of the pivotal connection 34 is such as to limit the swinging movement of the arch in one direction but permit it to swing in the other direction. A coil spring 36 is connected with the arch and with a convenient portion of the body for normally holding the landing gear in its operative position. Journaled upon opposite ends of the arch are pneumatic tired wheels 37 of ordinary construction. Pivotally connected with each arch is a link 38 which is in turn pivotally connected with one end of a lever 39 which is pivoted intermediate its ends upon the body, as shown at 40, and which has its other end pivotally connected with a reach rod 41 which extends rearwardly and which is pivotally connected with a control lever 42 suitably mounted on the frame of the body and located in convenient reach of the driver occupying the seat 32. The normal position of the landing gear is as shown in Figure 1, but it should be noted that by pulling upon the lever 42 the operator may cause the arch 33 and associated parts to fold up into the body so that the air resistance during flight will be decreased. It may be preferable to provide guards 43 on the body which cover the wheels of the landing gear when the landing gear is swung up into its inoperative position.

The wheel structure 35 includes a gear 44 with which meshes the bevel gear 45 carried by the lower end of a steering shaft 46 carrying a hand wheel 47. The purpose of this steering mechanism is to control the direction of travel of the device when it is running on the ground preparatory to flying or after landing.

Mounted adjacent each seat 32 is a control windlass 48 about which is coiled a flexible member 49 the opposite ends of which engage suitable guide rollers 50. The ends of the flexible member extend through openings in the fuselage and are connected at opposite points with the auxiliary wing extensions 25 whereby these extensions may be projected beyond the main wings to the desired extent. A suitable hand wheel structure must of course be associated with the windlass and the flexible member or members must be so arranged that when the windlass is turned in one direction the auxiliary planes or wings may be moved outwardly and when the windlass is turned in the other direction the auxiliary wings will be retracted so as to increase or decrease the supporting area as may be required by various conditions or circumstances.

Pivoted upon the rear end of the body or fuselage is the rudder structure 52 which is moved by means of a crank 53 carried by a shaft 54. The numeral 60 designates the tail wing. For controlling the ascent and descent of the machine, it is necessary to provide elevators 61 which are pivoted as shown at 62 and which have connected therewith the operating mechanism 63 which extends forwardly to control levers 64 adjacent the seats 32. By manipulating these levers 64 the elevators are tilted up or down to cause the device to ascend or descend at the desired angle.

Pivotally mounted upon the top of the body is a stabilizer 65 pivoted to the fuselage at 66 which carries control handles 67 within the fuselage and adjacent the seats 32. By manipulating the hand wheels the stabilizer may be swung to one side or the other to counteract any tendency of the device to tilt though this stabilizer provides means for banking when making turns.

A very important feature is the provision of control levers 72 which are suitably pivoted upon the frame of the body and which are pivotally connected with a longitudinally shiftable rod 73 which is slidably mounted beneath the body and which is connected, as shown at 74 with all of the damper plates 23 in the tubes 22. By manipulating the levers 72 these dampers may be opened or closed to a great extent whereby to permit free or limited passage or cut off passage of air through these tubes when the machine is descending, it being obvious that when the tubes are closed the descent will be retarded to a certain extent.

Mounted upon the upper portion of the front of the body is a search light 75 mounted upon a bracket 76 and having connected therewith a control rod 77 which is pivotally connected to an operating lever 78 which is pivoted on the frame of the body and which cooperates with a notched segment 79 whereby adjustment may be maintained.

Mounted at the lower portion of the front of the body is a search light 80 which is stationary or which may be made dirigible if preferred and which is for the purpose of illuminating the ground so that the operator may locate a place suitable for landing.

From the foregoing description and a study of the drawings it will be apparent that I have thus provided a simply constructed and easily operated aeroplane which may be built of sufficient size and strength to be used for passenger service. It is to be observed that I have made ample provision for all possible adjustment and controls so that every contingency may be met. The provision of the auxiliary or extension wings affords means for increasing the supporting area in case of a heavy load and makes the device much safer than the ordinary type of aeroplane.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. In an aeroplane, landing gear consisting of wheel like structure journaled beneath the body, steering mechanism for turning said wheel like structure, an arch pivotally connected with each wheel member, a coil spring connected with the body and the arch for normally holding the latter at one limit of its movement and for opposing movement in the other direction, and link and lever mechanism mounted on the body and connected with the arch for swinging the same upwardly to dispose the wheels at the sides of the body, said mechanism consisting of a link pivotally connected with the arch, a lever pivoted on the body and pivotally connected with said link, a rearwardly extending reach rod pivotally connected with the other end of the lever, and a control lever pivoted on the body and connected with said reach rod.

2. In an areoplane, landing gear consisting of wheel like structure journaled beneath the body, steering mechanism for turning said wheel like structure, an arch pivotally connected with each wheel member, a coil spring connected with the body and the arch for normally holding the latter at one limit of its movement and for opposing movement in the other direction, and link and lever mechanism mounted on the body and connected with the arch for swinging the same upwardly to dispose the wheels at the sides of the body, the steering mechanism consisting of a steering shaft journaled in the body and carrying a hand wheel and a bevel gear, and a gear wheel on said wheel structure meshing with said bevel gear.

In testimony whereof I affix my signature.

WILLIE X CALAGANS.
his mark

Witness to mark:
   WM. A. LAWRENCE,
   A. SAULTER.